United States Patent
Lee et al.

(10) Patent No.: US 9,661,651 B2
(45) Date of Patent: May 23, 2017

(54) FORWARDING A BUFFER STATUS REPORT FOR DUAL CONNECTIVITY

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/912,243

(22) PCT Filed: Aug. 5, 2014

(86) PCT No.: PCT/KR2014/007217
§ 371 (c)(1),
(2) Date: Feb. 16, 2016

(87) PCT Pub. No.: WO2015/041408
PCT Pub. Date: Mar. 26, 2015

(65) Prior Publication Data
US 2016/0198491 A1    Jul. 7, 2016

Related U.S. Application Data

(60) Provisional application No. 61/880,993, filed on Sep. 23, 2013.

(51) Int. Cl.
| H04W 72/00 | (2009.01) |
| H04W 72/12 | (2009.01) |
| H04W 28/02 | (2009.01) |
| H04B 7/024 | (2017.01) |
| H04W 88/02 | (2009.01) |
| H04W 88/08 | (2009.01) |

(52) U.S. Cl.
CPC ... *H04W 72/1284* (2013.01); *H04W 28/0278* (2013.01); *H04B 7/024* (2013.01); *H04W 88/02* (2013.01); *H04W 88/08* (2013.01)

(58) Field of Classification Search
None
See application file for complete search history.

(56) References Cited

U.S. PATENT DOCUMENTS

| 2011/0292873 A1 | 12/2011 | Guo |
| 2012/0099452 A1 | 4/2012 | Dai et al. |

(Continued)

FOREIGN PATENT DOCUMENTS

WO    2013/116988    8/2013

OTHER PUBLICATIONS

PCT International Application No. PCT/KR2014/007217, Written Opinion of the International Searching Authority dated Nov. 21, 2014, 10 pages.

*Primary Examiner* — Idowu O Osifade
(74) *Attorney, Agent, or Firm* — Lee Hong Degerman Kang Waimey

(57) ABSTRACT

The present invention relates to method for forwarding a buffer status report (BSR) for dual connectivity and devices therefor. In these schemes, the UE is simultaneously connected to a first eNB and a second eNB. The UE may transmit information on the amount of data to be transmitted to the first eNB to a second eNB. The second eNB may figured out that the received information is for the first eNB and/or second eNB.

9 Claims, 10 Drawing Sheets

(56) References Cited

U.S. PATENT DOCUMENTS

2013/0039314 A1  2/2013  Prateek et al.
2013/0058220 A1  3/2013  Yi et al.
2014/0177560 A1* 6/2014  Guo .................. H04W 72/1268
                                                370/329

* cited by examiner (a) Control-Plane Protocol Stack (b) User-Plane Protocol Stack

FORWARDING A BUFFER STATUS REPORT FOR DUAL CONNECTIVITY

CROSS-REFERENCE TO RELATED APPLICATIONS

This application is the National Stage filing under 35 U.S.C. 371 of International Application No. PCT/KR2014/007217, filed on Aug. 5, 2014, which claims the benefit of U.S. Provisional Application No. 61/880,993, filed on Sep. 23, 2013, the contents of which are all hereby incorporated by reference herein in their entirety.

TECHNICAL FIELD

The present invention relates to a wireless communication system and, more particularly, to methods for forwarding a buffer status report (BSR) for dual connectivity and devices therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in the conventional mobile communication system. The technical problems solved by the present invention are not limited to the above technical problems and those skilled in the art may understand other technical problems from the following description.

Technical Solution

To achieve the object of the present invention, in one aspect, a method of communicating with a network at a user equipment (UE) in a wireless communication system is provided. The method comprises: calculating an amount of data to be transmitted to a first eNB; and transmitting information on the amount of data to be transmitted to the first eNB to a second eNB, wherein the UE is simultaneously connected to the first eNB and the second eNB.

The above information on the amount of data to be transmitted to the first eNB may be a buffer status report (BSR) for the first eNB, if the above schemes are applied to the LTE-based system. However, the terms and/formats may be different when the present invention is applied to other system.

The transmitting action may be performed, when the BSR cannot be transmitted to the first eNB. But, the transmitting action can be performed in other circumstance.

To support the dual connectivity, the UE may have the first MAC entity and a second MAC entity respectively corresponding to a first eNB and a second eNB. Based on this, the above transmitting action may be performed by forwarding, by the first MAC entity, the BSR for the first eNB to the second MAC entity; and transmitting, by the second MAC entity, the BSR for the first eNB to the second eNB.

A long buffer status report (long BSR) may be transmitted to the second eNB, when there are more than one logical channel groups (LCGs) having data available for transmission, and a short BSR may be transmitted to the second eNB, when there is one LCG having data available for transmission.

When the long BSR is transmitted, the second MAC entity may set buffer status values for each of LCGs of the first MAC entity as forwarded from the first MAC entity, and may set buffer status values for each of one more LCGs of the second MAC entity as zero. But, the second MAC entity may set buffer status values for each of one more LCGs of the second MAC entity as calculated by the second MAC entity.

The above method may further comprises: starting a timer, by the first MAC entity, when the first MAC entity forwards the BSR for the first eNB to the second MAC entity; stopping the timer, when the first MAC entity receives an uplink grant signal from the first eNB; and restarting the timer, when the timer expires and the first MAC entity does not receive an uplink grant signal from the first eNB. Here, the first MAC entity may not forward the BSR for the first eNB to the second eNB while the timer is running.

The second MAC entity may not start a retransmit BSR timer (retxBSR-Timer) and a periodic BSR timer (periodicBSR-Timer), when the BSR for the first eNB is transmitted.

The method may further comprises: setting, by the second MAC entity, buffer status values for each of one more LCGs of the first MAC entity as zero, after repeating the transmission of the BSR to the second eNB.

The method may further comprises: transmitting a long buffer status report (long BSR) to the second eNB, when there are more than one logical channel groups (LCGs) of the second MAC entity having data available for transmission, wherein the second MAC entity sets buffer status values for each of one or more LCGs of the first MAC entity as zero, and sets buffer status values for each of LCGs of the second MAC entity as determined by the second MAC entity.

In another aspect, a method of communicating with a user equipment (UE) at a second base station in a wireless communication system is provided. The method comprises: receiving information on the amount of data to be transmitted from the UE; and forwarding the received information on the amount of data to be transmitted to a first base station, if the received information indicates that the amount of data to be transmitted to the first base station is not zero, wherein the second base station is simultaneously connected to the UE as the first base station.

In another aspect of the present invention, a user equipment (UE) communicating with a network in a wireless communication system is provided. The UE comprises: a transceiver configured to transmit and receive signals; and a processor connected to the transceiver and configured to calculate an amount of data to be transmitted to a first eNB, wherein the processor controls the transceiver to transmit information on the amount of data to be transmitted to the first eNB to a second eNB, and wherein the UE is simultaneously connected to the first eNB and the second eNB.

In still another aspect of the present invention, a base station device operating as a second base station communicating with a user equipment (UE) in a wireless communication system is provided. The device may comprise: a transceiver configured to transmit and receive signals; and a processor connected to the transceiver and configured to receive information on the amount of data to be transmitted from the UE, wherein the processor controls the transceiver to forward the information on the amount of data to be transmitted to a first base station, if the information indicates that the amount of data to be transmitted to the first base station is not zero, wherein the device is simultaneously connected to the UE as the first base station.

It is to be understood that both the foregoing general description and the following detailed description of the present invention are exemplary and explanatory and are intended to provide further explanation of the invention as claimed.

Advantageous Effects

According to the present invention, calculating and reporting a buffer status can be efficiently performed in a wireless communication system. Specifically, the UE can report amount of data available for transmission to each base station in dual connectivity system.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
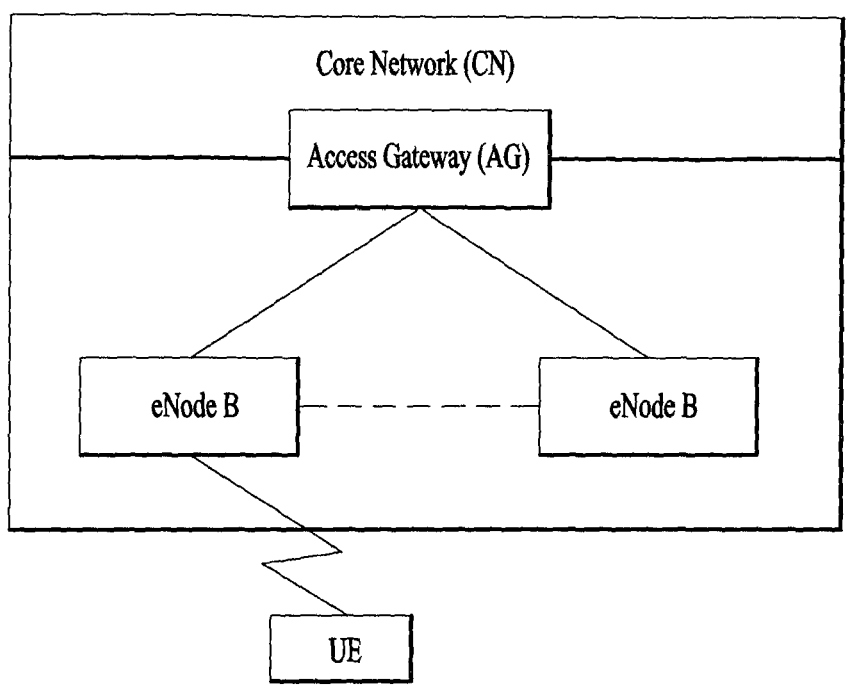
FIG. 1 is a diagram showing a network structure of an Evolved Universal Mobile Telecommunications System (E-UMTS) as an example of a wireless communication system.
Figure 2:
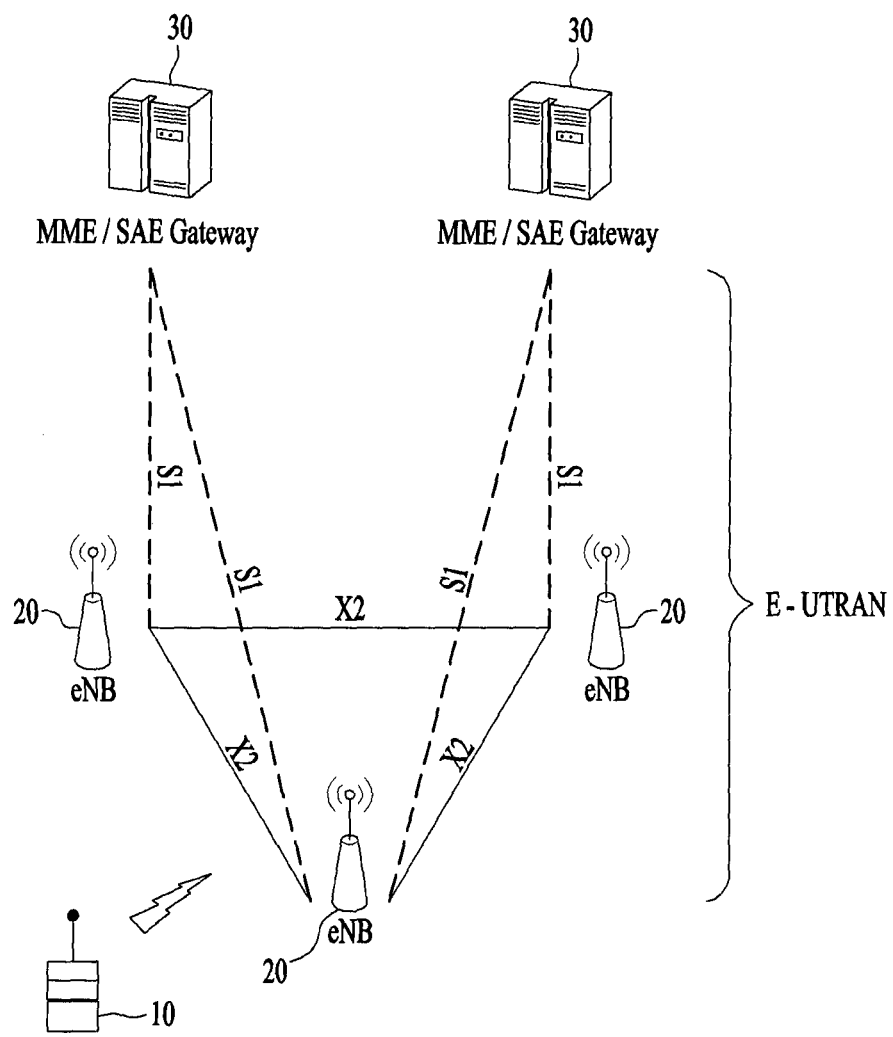
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 3:
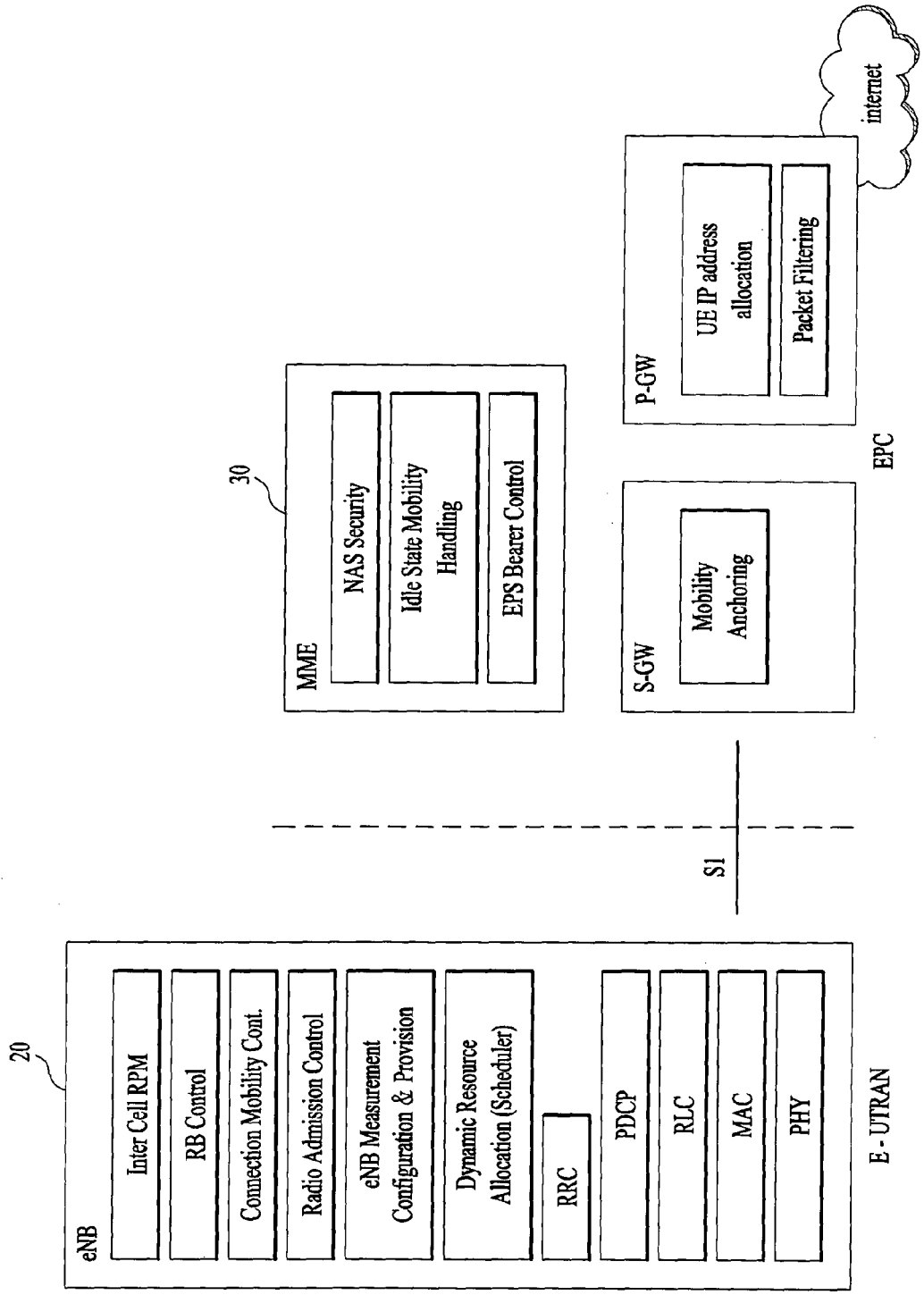
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
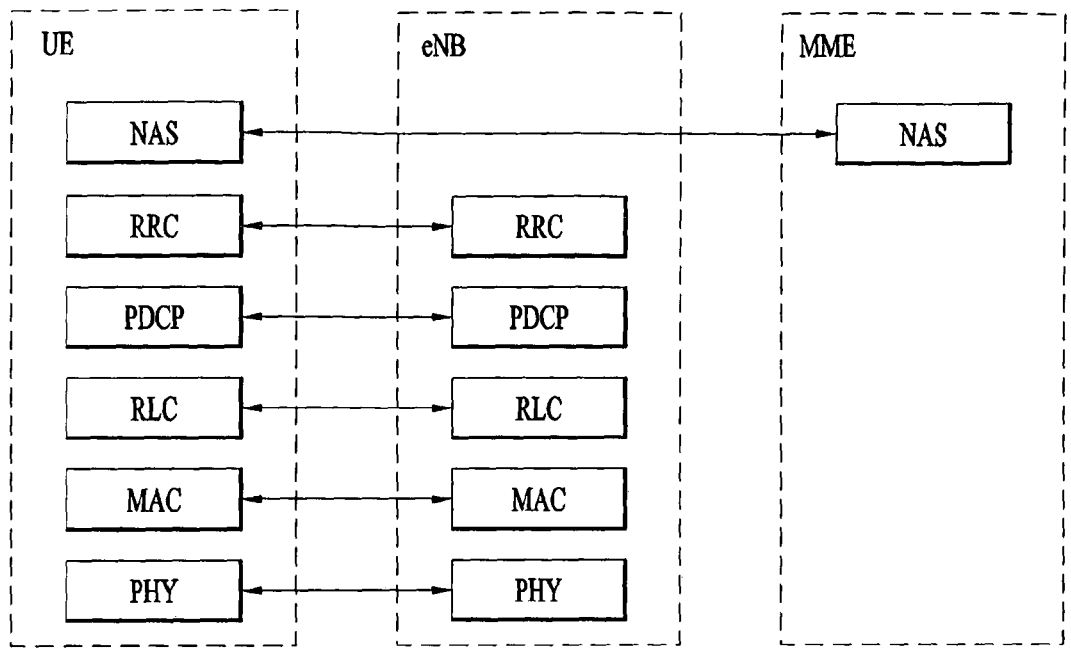
FIG. 4 is a diagram showing a control plane and a user plane of a radio interface protocol between a UE and an E-UTRAN based on a 3rd generation partnership project (3GPP) radio access network standard.
Figure 4:
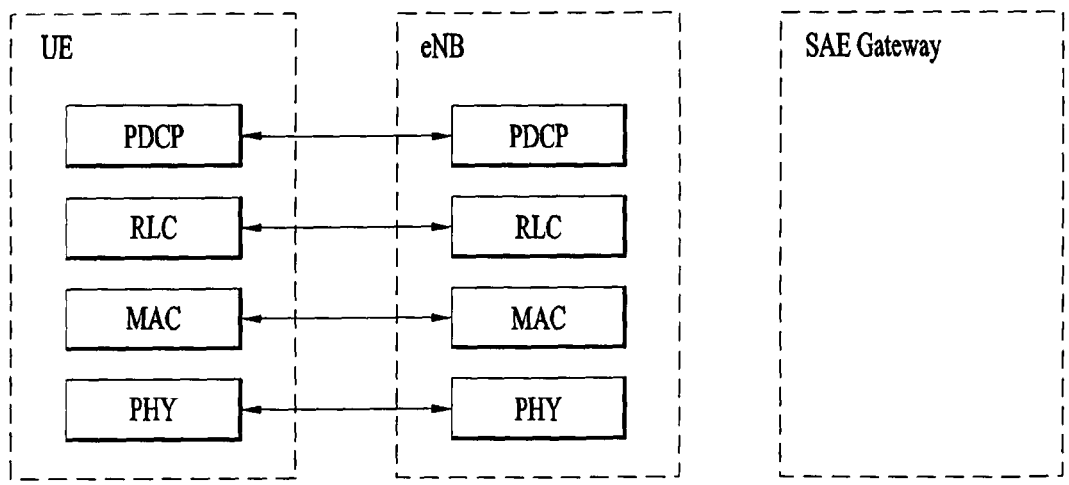

FIG. 4 is a diagram showing a control plane and a user plane of a radio interface protocol between a UE and an E-UTRAN based on a 3GPP radio access network standard.

The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
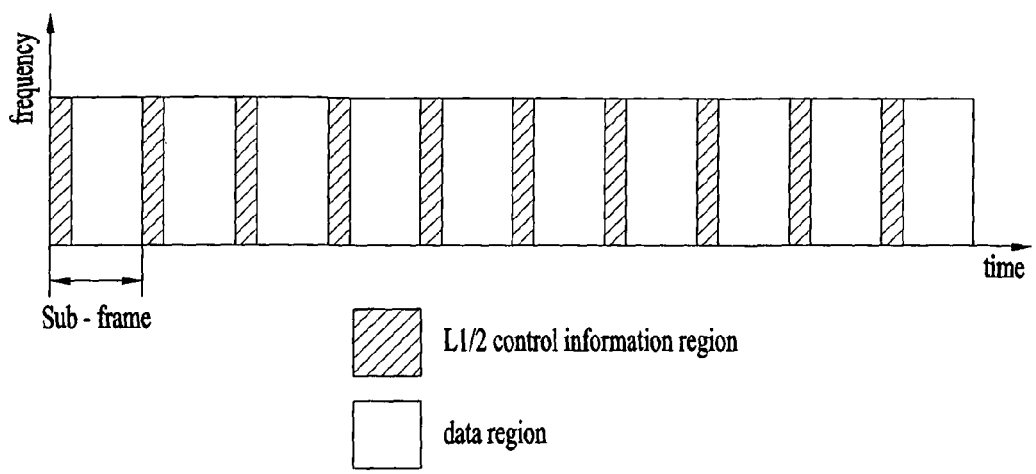
FIG. 5 is a diagram of an example physical channel structure used in an E-UMTS system.

FIG. 5 is a view showing an example of physical channel structure used in an E-UMTS system.

A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 6:
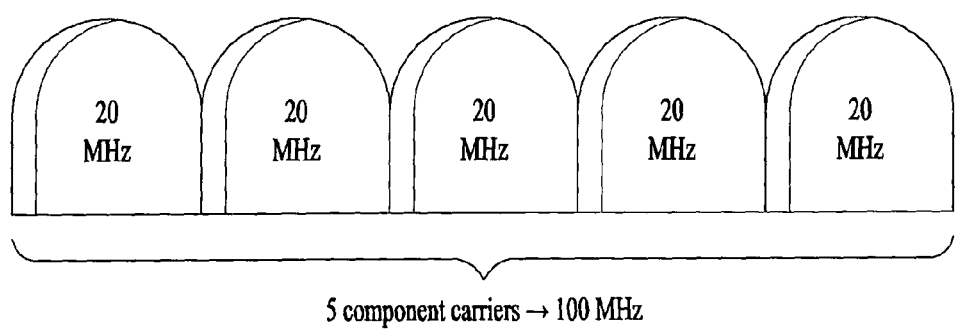
FIG. 6 is a diagram for carrier aggregation.

FIG. 6 is a diagram for carrier aggregation.

Carrier aggregation technology for supporting wide bandwidth. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

As stated above, the present invention is related with efficient reporting of the information on the amount of data to be transmitted. The information on the amount of data to be transmitted can have various forms in various mobile communication systems. In 3GPP LTE system, it is referred to as buffer status reporting (BSR). As one example, the BSR procedure in LTE system is explained.

The Buffer Status reporting procedure is used to provide the serving eNB with information about the amount of data available for transmission in the UL buffers of the UE. RRC controls BSR reporting by configuring the two timers periodic BSR timer (periodicBSR-Timer) and retransmission BSR timer (retxBSR-Timer) and by, for each logical channel, optionally signaling logicalChannelGroup which allocates the logical channel to an LCG.

For the Buffer Status reporting procedure, the UE shall consider all radio bearers which are not suspended and may consider radio bearers which are suspended.

If the Buffer Status reporting procedure determines that at least one BSR has been triggered and not cancelled, and if the UE has UL resources allocated for new transmission for this TTI, the UE may instruct the Multiplexing and Assembly procedure to generate the BSR MAC control element(s), start or restart periodicBSR-Timer except when all the generated BSRs are Truncated BSRs; start or restart retxBSR-Timer. Otherwise, if a Regular BSR has been triggered, and if an uplink grant is not configured or the Regular BSR was not triggered due to data becoming available for transmission for a logical channel for which logical channel SR masking (logicalChannelSR-Mask) is setup by upper layers, a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The UE shall restart retxBSR-Timer upon indication of a grant for transmission of new data on any UL-SCH.

All triggered BSRs shall be cancelled in case the UL grant(s) in this subframe can accommodate all pending data available for transmission but is not sufficient to additionally accommodate the BSR MAC control element plus its subheader. All triggered BSRs shall be cancelled when a BSR is included in a MAC PDU for transmission. The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI reflect the buffer status after all MAC PDUs have been built for this TTI. Each LCG shall report at the most one buffer status value per TTI and this value shall be reported in all BSRs reporting buffer status for this LCG.

A Padding BSR is not allowed to cancel a triggered Regular/Periodic BSR. A Padding BSR is triggered for a specific MAC PDU only and the trigger is cancelled when this MAC PDU has been built.

For the purpose of MAC buffer status reporting, the UE shall consider the following as data available for transmission in the RLC layer.

(a) RLC SDUs, or segments thereof, that have not yet been included in an RLC data PDU, (b) RLC data PDUs, or portions thereof, that are pending for retransmission (RLC AM).

In addition, if a STATUS PDU has been triggered and t-StatusProhibit is not running or has expired, the UE shall estimate the size of the STATUS PDU that will be transmitted in the next transmission opportunity, and consider this as data available for transmission in the RLC layer.

On the other hand, for the purpose of MAC buffer status reporting, the UE shall consider PDCP Control PDUs, as well as the following as data available for transmission in the PDCP layer.

For SDUs for which no PDU has been submitted to lower layers, (a) the SDU itself, if the SDU has not yet been processed by PDCP, or (b) the PDU if the SDU has been processed by PDCP.

In addition, for radio bearers that are mapped on RLC AM, if the PDCP entity has previously performed the re-establishment procedure, the UE shall also consider the following as data available for transmission in the PDCP layer:

For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received: the SDU, if it has not yet been processed by PDCP, or the PDU once it has been processed by PDCP.

As explained above, the UE transmits Buffer Status Report (BSR) to the eNB to assist the eNB in allocating the uplink radio resources to the different UEs by indicating the amount of data buffered across the UE's PDCP and RLC memory. The BSR shall be triggered by the timers and the events as described in the above. For example, there are timers, i.e., retxBSR-Timer and periodicBSR-Timer, which triggers BSR upon timer expiry.

In LTE Rel-12, a new study on Small Cell Enhancement is started, where the dual connectivity is supported. That is, UE is connected to both Macro cell and Small cell, as shown in FIG. 6.

Figure 7:
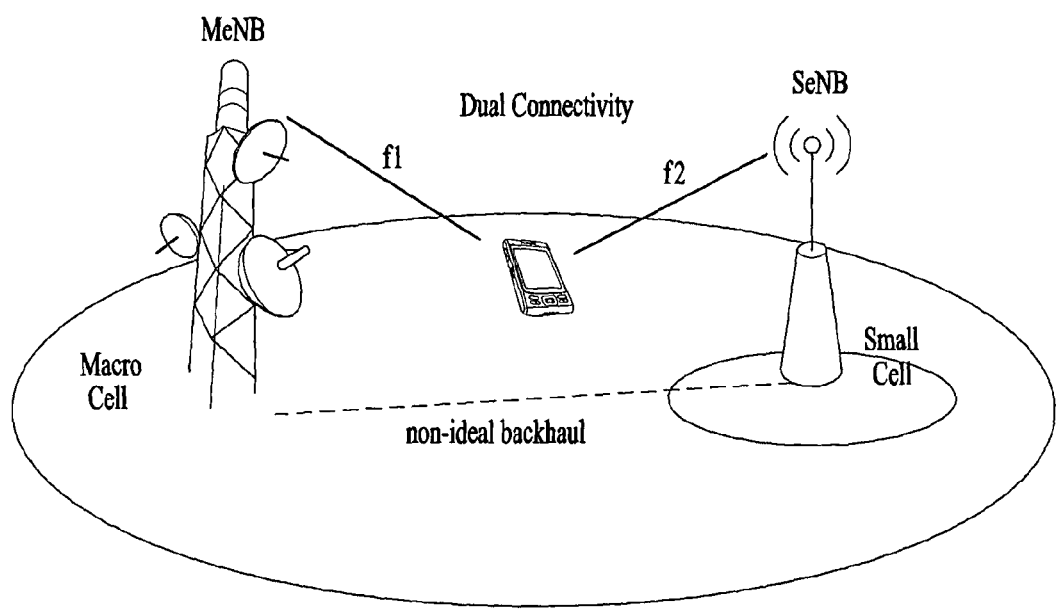
FIG. 7 is a diagram for explaining dual connectivity of the UE according to one aspect of the present invention.

FIG. 7 is a diagram for explaining dual connectivity of the UE according to one aspect of the present invention.

In FIG. 7, the MeNB stands for Macro cell eNB, and SeNB for Small cell eNB. Small cell may comprise femto cell, pico cell, etc.

The interface between MeNB and SeNB is called Xn interface. The Xn interface is assumed to be non-ideal; i.e. the delay in Xn interface could be up to 60 ms.

The SeNB is responsible for transmitting best effort (BE) type traffic, while the MeNB is responsible for transmitting other types of traffic such as VoIP, streaming data, or signaling data. Here, BE type traffic may be delay tolerable and error intolerable traffic.

To support dual connectivity, various protocol architectures are studied, and one of potential architectures according to one aspect of the present invention is shown in FIG. 7.

Figure 8:
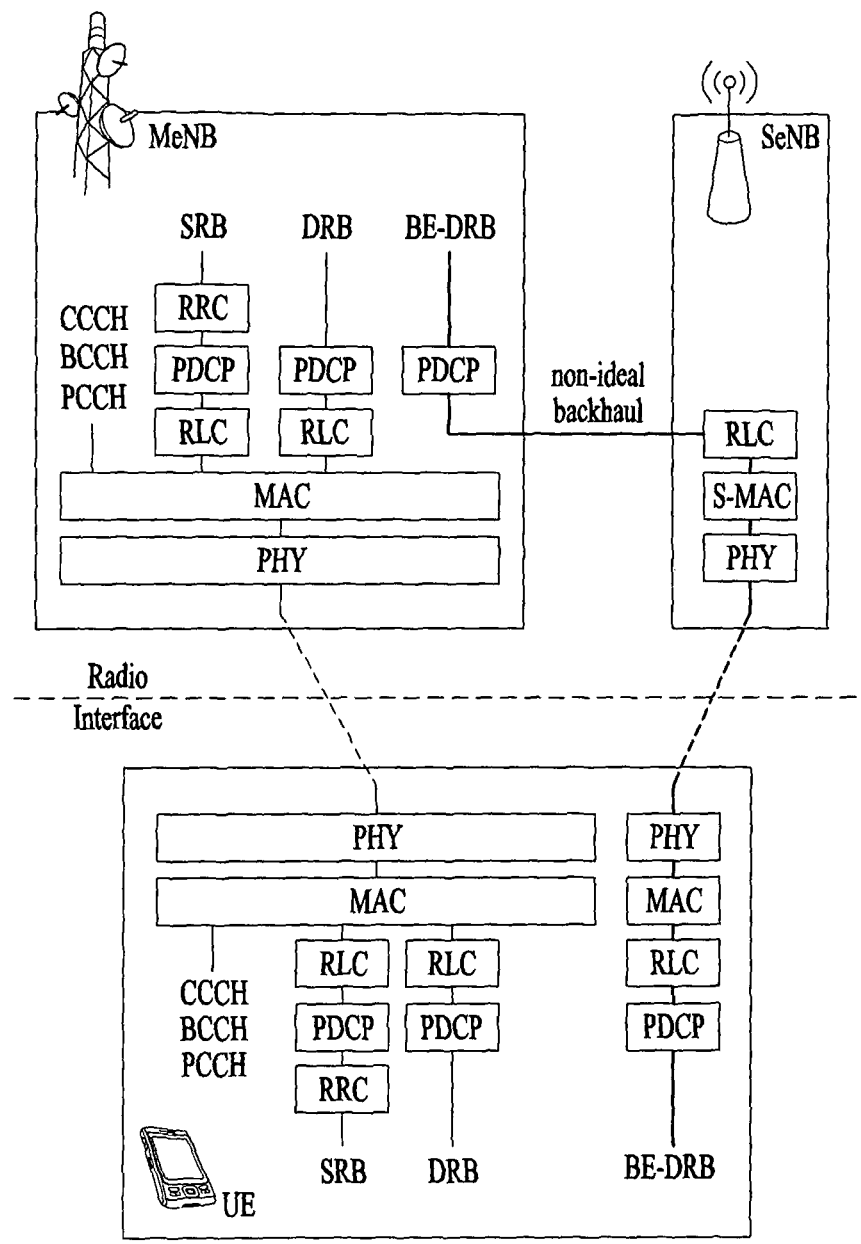
FIG. 8 is a diagram showing an exemplary architecture for supporting dual connectivity.

FIG. 8 is a diagram showing an exemplary architecture for supporting dual connectivity.

In FIG. 8, MeNB has various radio bearers, signaling radio bearer (SRB), data radio bearer (DRB) and best effort DRB (BE-DRB). In view of BE-DRB, PDCP and RLC entities are located in different network nodes, i.e. PDCP in MeNB and RLC in SeNB.

In the UE side, the protocol architecture is same as prior art except that the MAC entity is setup for each eNB (i.e. M-MAC for MeNB and S-MAC for SeNB). This is because the scheduling nodes are located in different nodes and two nodes are linked with non-ideal backhaul.

There are two MAC entities in the UE, i.e., M-MAC and S-MAC: The M-MAC is responsible for transmission between the UE and the MeNB, and the S-MAC is in charge of transmission between the UE and the SeNB. In the description below, M-MAC refers to the M-MAC in the UE and S-MAC refers to the S-MAC in the UE, except the cases when defined otherwise. The M-MAC in the MeNB and S-MAC in the SeNB will be explicitly specified.

In this dual connectivity situation, the BSR function is performed in each MAC entity, i.e., M-MAC and S-MAC, in the UE, since the UL resource scheduling node is located in different areas, i.e., one in MeNB and the other one in SeNB. After the UE transmits the BSR from each MAC entity to the corresponding eNB, the UE receives the UL grant from the corresponding MeNB and SeNB.

Due to the different situation of the MeNB and the SeNB, there can be some cases that S-MAC of the UE is not able to perform the BSR to the SeNB. For example, there may be no UL grant for transmitting the BSR to the SeNB or no dedicated SR for the S-MAC. In these cases, there is no mechanism for the UE to report the buffer status of S-MAC to the SeNB so far.

To address this difficulty, one embodiment of the present invention proposes a method for the UE simultaneously connected to the first eNB and the second eNB (dual connectivity). In this method, the UE calculates an amount of data to be transmitted to a first eNB. And, the UE transmits information on the amount of data to be transmitted to the first eNB to a second eNB. Preferably, the transmission of information on the amount of data to be transmitted to the first eNB is performed when the UE cannot transmit it directly to the second eNB. In an example of LTE system, the above information on the amount of data to be transmitted to the first eNB may be BSR for the first eNB. Detailed procedures for this method is explained with regards to FIG. 9.

Figure 9:
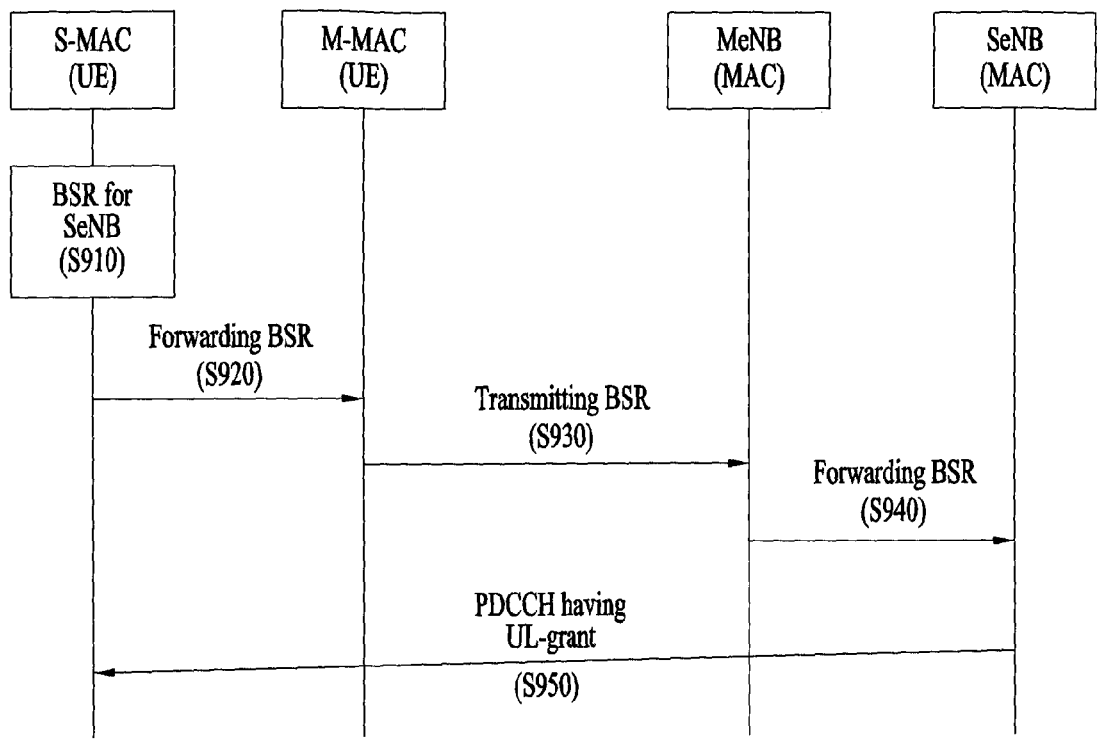
FIG. 9 is a diagram for explaining one preferred embodiment of the present invention.

FIG. 9 is a diagram for explaining one preferred embodiment of the present invention.

As shown in FIG. 9, the UE has two MAC entities, S-MAC and M-MAC in dual connectivity situation. S-MAC may trigger the BSR for the SeNB (S910). A BSR shall be triggered if any of the following events occur:

(A) UL data, for a logical channel which belongs to a LCG, becomes available for transmission in the RLC entity or in the PDCP entity (the definition of what data shall be considered as available for transmission is explained above) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR".

(B) UL resources are allocated and number of padding bits is equal to or larger than the size of the Buffer Status Report MAC control element plus its subheader, in which case the BSR is referred below to as "Padding BSR".

(C) retxBSR-Timer expires and the UE has data available for transmission for any of the logical channels which belong to a LCG, in which case the BSR is referred below to as "Regular BSR";

(D) periodicBSR-Timer expires, in which case the BSR is referred below to as "Periodic BSR".

As explained above, there may be a case when the S-MAC triggers a BSR but is not able to transmit the BSR to the SeNB. In this embodiment, the S-MAC may forward the buffer status information under control of the S-MAC to the M-MAC (S920). And, the M-MAC may transmit a BSR including the buffer status information under control of the S-MAC to the MeNB (S930). Then, the MeNB may forward the buffer status information under control of the S-MAC to the SeNB (S940). By using this information, the SeNB can allocate the UL grant to the S-MAC according to the received buffer status information (S950). This UL-grant may be received through a PDCCH, as shown in FIG. 9.

When the S-MAC forwards the buffer status information (S920), if the S-MAC is configured with one or more LCGs, then the S-MAC forwards the buffer status information of each LCG to the M-MAC.

When the M-MAC receives buffer status information under control of the S-MAC from the S-MAC (S920), the M-MAC may trigger a BSR to the MeNB. That is, according to the present embodiment, the M-MAC has another triggering condition of BSR comparing to the S-MAC (conditions (A), (B), (C) and (D) above).

M-MAC may use Long BSR or Short BSR based on situation explained below.

Figure 10:
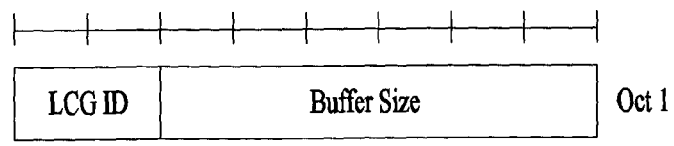
FIGS. 10 and 11 respectively show formats of short BSR and long BSR.
Figure 11:
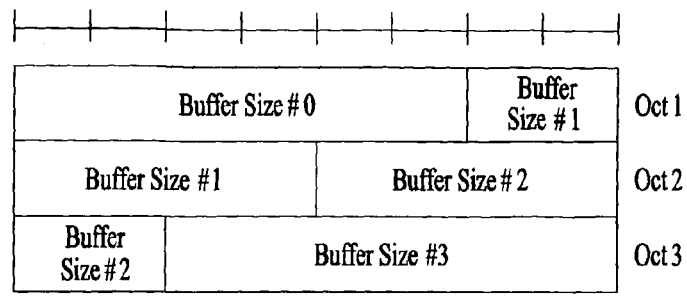

FIGS. 10 and 11 respectively show formats of short BSR and long BSR.

BSR MAC control elements comprise: (a) Short BSR and Truncated BSR format: one LCG ID field and one corresponding Buffer Size field as shown in FIG. 10; or Long BSR format: four Buffer Size fields, corresponding to LCG IDs #0 through #3 as shown in FIG. 11. The BSR formats are identified by MAC PDU subheaders with LCIDs as specified in predetermined manner.

The fields LCG ID and Buffer Size are defined as follow:

LCG ID: The Logical Channel Group ID field identifies the group of logical channel(s) which buffer status is being reported. The length of the field may be 2 bits.

Buffer Size: The Buffer Size field identifies the total amount of data available across all logical channels of a logical channel group after all MAC PDUs for the TTI have been built. The amount of data is indicated in number of bytes. It shall include all data that is available for transmission in the RLC layer and/or in the PDCP layer. The size of the RLC and MAC headers are not considered in the buffer size computation. The length of this field is 6 bits. If extendedBSR-Sizes is not configured, the values taken by the Buffer Size field are shown in Table 1.

TABLE 1

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

If extendedBSR-Sizes is configured, the values taken by the Buffer Size field are shown in Table 2.

TABLE 2

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 2041711 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

The M-MAC according to this embodiment may trigger a Long BSR or a Short BSR to the MeNB according to the number of LCG of the S-MAC that has data available for transmission.

Specifically, if more than one LCGs in the S-MAC have data available for transmission, the M-MAC may report the Long BSR. Here, for the LCGs under control of the S-MAC, the M-MAC may set the buffer status value as forwarded from the S-MAC. For the LCGs under control of the M-MAC, the M-MAC may set the buffer status value as calculated by the M-MAC or as an empty buffer status, i.e., zero.

On the other hand, if one LCG in the S-MAC has data available for transmission, the M-MAC may report the Short BSR. For the LCG under control of the S-MAC, the M-MAC may set the buffer status value as forwarded from the S-MAC.

In another embodiment, the M-MAC may use short BSR or long BSR according to the number of LCG across the M-MAC and the S-MAC that have data available for transmission.

Specifically, if more than one LCGs in the M-MAC and the S-MAC have data available for transmission, the M-MAC may report the Long BSR. Here, for the LCGs under control of the S-MAC, the M-MAC may set the buffer status value as forwarded from the S-MAC. For the LCGs under control of the M-MAC, the M-MAC may set the buffer status value as calculated by the M-MAC or as an empty buffer status, i.e., zero.

On the other hand, if one LCG across the M-MAC and the S-MAC has data available for transmission, the M-MAC may report the Short BSR. In this case, only the LCG under control of the S-MAC has data available for transmission. Thus, the M-MAC may set the buffer status value as forwarded from the S-MAC.

In one exemplary embodiment, when the M-MAC triggers a BSR upon receiving buffer status information under control of the S-MAC from the S-MAC, the M-MAC does not start retxBSR-Timer, and/or the M-MAC does not start periodicBSR-Timer.

After the M-MAC transmits a pre-defined number (e.g. 1) of BSRs to the MeNB, the M-MAC may consider that there is no data available for transmission in the LCGs under control of the S-MAC and sets the buffer status of the LCGs under control of the S-MAC to zero, i.e., empty buffer status. The pre-defined number of BSR transmissions may be configured by the network using an RRC/MAC signaling.

When the M-MAC triggers a Long BSR by the data available for transmission in the LCGs under control of the M-MAC, the M-MAC may set the buffer status of LCGs under control of the S-MAC to zero, i.e., empty buffer status.

When the MeNB receives a BSR from the M-MAC in the UE (S930), if the buffer status value of the LCGs under control of the S-MAC is set to a non-zero value, then the MeNB considers that the BSR is triggered by the S-MAC in the UE and may forward the corresponding buffer status information to the SeNB.

When the SeNB receives buffer status information of the LCGs under control of the S-MAC in the UE from the MeNB (S940), the SeNB may send a PDCCH to the S-MAC in the UE according to the buffer status information (S950). The PDCCH may include (a) PDCCH order for Random Access procedure initiation, and/or (b) PDCCH for UL grant.

In another aspect of the present invention, a new timer is introduced. In order to prohibit the buffer status information forwarding from the S-MAC to M-MAC during a certain time period, a new timer is proposed, which is called ProhibitBSRForwardingTimer.

Figure 12:
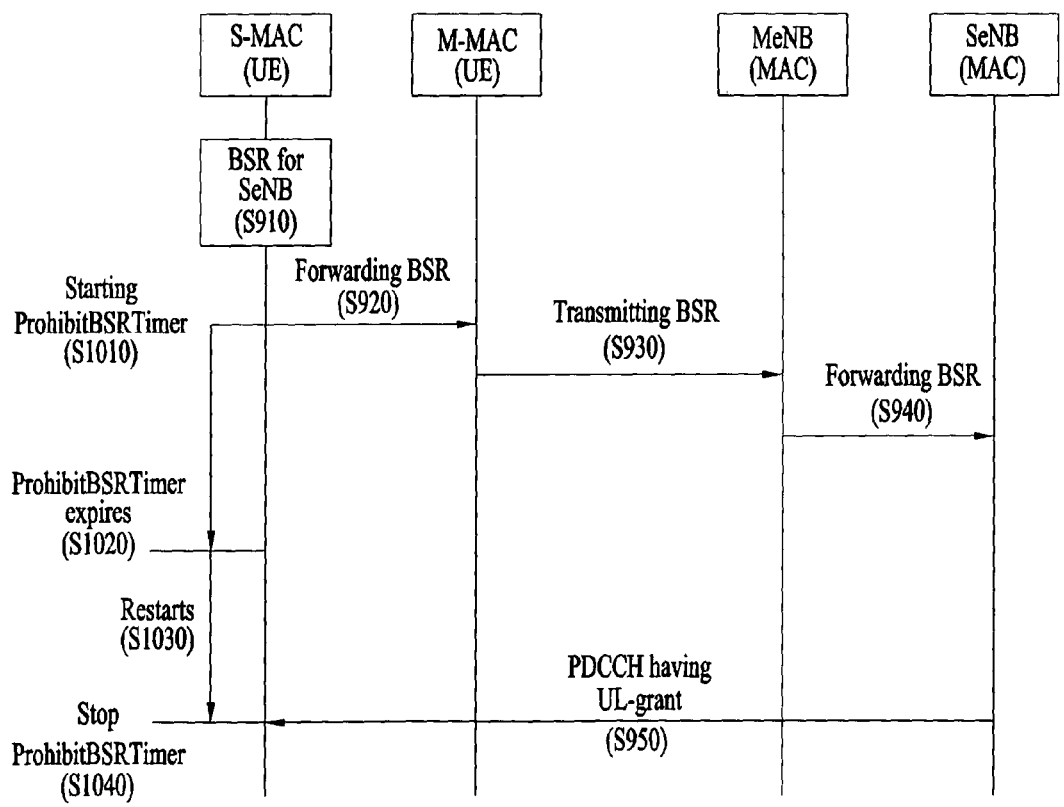
FIG. 12 is a diagram for explaining a timer according to one example of the present invention.

FIG. 12 is a diagram for explaining a timer according to one example of the present invention.

Configuration of ProhibitBSRForwardingTimer can be as follows. The network may configure the UE with ProhibitBSRForwardingTimer for a UE by RRC signaling. ProhibitBSRForwardingTimer may be defined by the number of subframes or time period.

The operation of ProhibitBSRForwardingTimer shall be as following:

When the S-MAC forwards the buffer status information under control of the S-MAC to the M-MAC (S920), the S-MAC may start ProhibitBSRForwardingTimer (S1010).

While the ProhibitBSRForwardingTimer is running, the S-MAC does not forward any buffer status information under control of the S-MAC to the M-MAC.

When ProhibitBSRForwardingTimer expires (S1020), if the S-MAC does not receive any DL signal (PDCCH) from the SeNB, the S-MAC may restart ProhibitBSRForwardingTimer (S1030). If the S-MAC receives any DL signal (PDCCH) from the SeNB while ProhibitBSRForwardingTimer is running, the S-MAC may stop ProhibitBSRForwardingTimer (S1040).

The above embodiments/examples of the present invention can be applied to the case when the MeNB and the SeNB are changed in the above scenario. If the M-MAC triggers a BSR but is not able to transmit the BSR to the MeNB, the M-MAC may forward the buffer status information under control of the M-MAC to the S-MAC, and the S-MAC may transmit a BSR including the buffer status information under control of the M-MAC to the SeNB.

Then, the SeNB may forward the buffer status information under control of the M-MAC to the MNB, and the MeNB can allocate the UL grant to the M-MAC according to the received buffer status information. In this case, the ProhibitBSRForwardingTimer is configured in the M-MAC.

Figure 13:
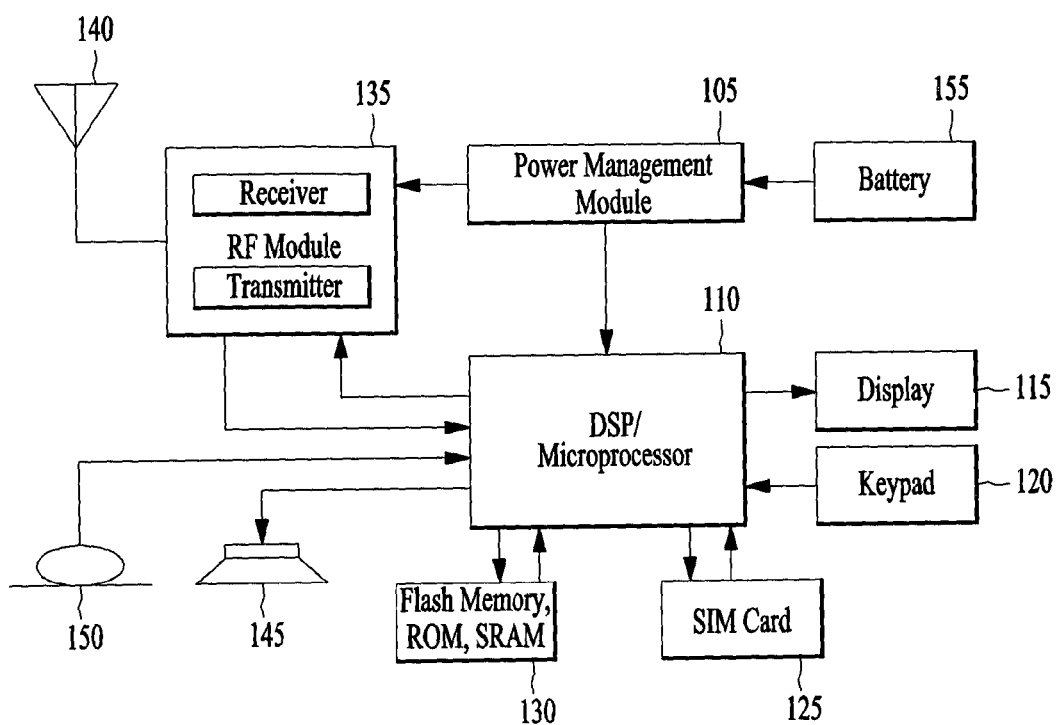
FIG. 13 is a block diagram of a communication apparatus according to an embodiment of the present invention.

FIG. 13 is a block diagram of a communication apparatus according to an embodiment of the present invention.

The apparatus shown in FIG. 13 can be a user equipment (UE) and/or eNB adapted to perform the above mechanism, but it can be any apparatus for performing the same operation.

As shown in FIG. 13, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 13 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 13 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems, e.g. IEEE system, in addition to the 3GPP LTE system.

The invention claimed is:

1. A method of communicating with a network at a user equipment (UE) in a wireless communication system, the UE being simultaneously connected to a first eNB and a second eNB, the UE including a processor having a first medium access control (MAC) entity corresponding to the first eNB and a second MAC entity corresponding to the second eNB, the method comprising:

generating a buffer status report (BSR) for the first eNB, the BSR including information on an amount of data to be transmitted to the first eNB;

when the first MAC entity cannot transmit the BSR to the first eNB, forwarding the BSR for the first eNB by the first MAC entity to the second MAC entity, and starting a timer; and transmitting, by the second MAC entity to the second eNB, the BSR to the second eNB for forwarding to the first eNB, wherein the first MAC entity does not forward any additional BSR for the first eNB to the second MAC entity of the UE while the timer is running.

2. The method of claim 1, wherein a long buffer status report (long BSR) is transmitted to the second eNB, when there are more than one logical channel groups (LCGs) having data available for transmission, and wherein a short BSR is transmitted to the second eNB, when there is one LCG having data available for transmission.

3. The method of claim 2, wherein, when the long BSR is transmitted, the second MAC entity sets buffer status values for each of LCGs of the first MAC entity as forwarded from the first MAC entity, and sets buffer status values for each of one more LCGs of the second MAC entity as zero.

4. The method of claim 1, further comprising:

stopping the timer by the first MAC entity, when the first MAC entity receives an uplink grant signal from the first eNB in response to the transmitted BSR; or restarting the timer by the first MAC entity, when the timer expires and the first MAC entity does not receive an uplink grant signal from the first eNB in response to the transmitted BSR.

5. The method of claim 1, wherein the second MAC entity does not start a retransmit BSR timer (retxBSR-Timer) and a periodic BSR timer (periodicBSR-Timer), when the BSR for the first eNB is transmitted.

6. The method of claim 1, further comprising:

setting, by the second MAC entity, buffer status values for each of one more LCGs of the first MAC entity as zero, after repeating the transmission of the BSR to the second eNB.

7. The method of claim 1, further comprising:

transmitting a long buffer status report (long BSR) to the second eNB, when there are more than one logical channel groups (LCGs) of the second MAC entity having data available for transmission, wherein the second MAC entity sets buffer status values for each of one or more LCGs of the first MAC entity as zero, and sets buffer status values for each of LCGs of the second MAC entity as determined by the second MAC entity.

8. A user equipment (UE) communicating with a network in a wireless communication system while being simultaneously connected to a first eNB and a second eNB, the UE comprising:

a transceiver configured to transmit and receive signals; and a processor connected to the transceiver, the processor including a first medium access control (MAC) entity configured to control the transceiver to transmit and receive signals to and from the first eNB, and a second MAC entity configured to control the transceiver to transmit and receive signals to and from the second eNB, wherein the processor is configured to generate a buffer status report (BSR) for the first eNB, the BSR including information on an amount of data to be transmitted to the first eNB, wherein, when the first MAC entity cannot transmit the BSR to the first eNB, the first MAC entity is configured to start a timer and forward the BSR for the first eNB to a second MAC entity of the UE, wherein the second MAC entity is configured to transmit the BSR to the second eNB for forwarding to the first eNB, and wherein the first MAC entity does not forward any additional BSR for the first eNB to the second MAC entity of the UE while the timer is running.

9. The UE of claim 8, wherein the first MAC entity is configured to:

stop the timer when the first MAC entity receives an uplink grant signal from the first eNB in response to the transmitted BSR; or restart the timer, when the timer expires and the first MAC entity does not receive an uplink grant signal from the first eNB in response to the transmitted BSR.

\* \* \* \* \*